United States Patent
Johansson et al.

(10) Patent No.: US 8,620,488 B2
(45) Date of Patent: Dec. 31, 2013

(54) METHOD AND MODULE FOR DETERMINING OF REFERENCE VALUES FOR A VEHICLE CONTROL SYSTEM

(75) Inventors: Oskar Johansson, Stockholm (SE); Jörgen Hansson, Hägersten (SE); Henrik Pettersson, Södertälje (SE)

(73) Assignee: Scania CV AB (SE)

( * ) Notice: Subject to any disclaimer, the term of this patent is extended or adjusted under 35 U.S.C. 154(b) by 67 days.

(21) Appl. No.: 13/377,168

(22) PCT Filed: May 31, 2010

(86) PCT No.: PCT/SE2010/050589
§ 371 (c)(1),
(2), (4) Date: Dec. 9, 2011

(87) PCT Pub. No.: WO2010/144026
PCT Pub. Date: Dec. 16, 2010

(65) Prior Publication Data
US 2012/0083943 A1    Apr. 5, 2012

(30) Foreign Application Priority Data
Jun. 10, 2009 (SE) .................................. 0950434

(51) Int. Cl.
*G05D 1/00* (2006.01)

(52) U.S. Cl.
USPC ................................................................ 701/1

(58) Field of Classification Search
USPC .................... 701/1, 70, 121, 401, 93
See application file for complete search history.

(56) References Cited

U.S. PATENT DOCUMENTS

| | | | |
|---|---|---|---|
| 6,549,841 B1 * | 4/2003 | AxElsson | 701/70 |
| 6,847,887 B1 * | 1/2005 | Casino | 701/461 |
| 2003/0163226 A1 | 8/2003 | Tan | |
| 2004/0068359 A1 | 4/2004 | Neiss et al. | |
| 2007/0265759 A1 * | 11/2007 | Salinas et al. | 701/93 |
| 2008/0188996 A1 | 8/2008 | Lucas et al. | |
| 2009/0037070 A1 * | 2/2009 | Nakamura | 701/96 |

FOREIGN PATENT DOCUMENTS

| | | | | |
|---|---|---|---|---|
| EP | 1302357 A1 * | 4/2003 | | B60K 31/04 |
| EP | 1334863 A2 * | 8/2003 | | B60K 31/00 |
| EP | 1885576 B1 * | 5/2011 | | B60K 31/00 |
| JP | 7117524 A | 5/1995 | | |
| SE | 529578 C2 | 9/2007 | | |

OTHER PUBLICATIONS

International Search Report dated Sep. 9, 2010, issued in corresponding international application No. PCT/SE2010/050589.

* cited by examiner

*Primary Examiner* — Mary Cheung
*Assistant Examiner* — Anne Mazzara
(74) *Attorney, Agent, or Firm* — Ostrolenk Faber LLP (57) ABSTRACT

A method for determining set-point values for a vehicle's control systems having the steps of: determining a horizon by means of position data and map data of an itinerary made up of route segments with at least one characteristic for each segment; calculating threshold values for at least one characteristic of segments according to one or more vehicle-specific values, which threshold values serve as boundaries for assigning segments to various categories; comparing the at least one characteristic of each segment with the calculated threshold values and placing each segment within the horizon in a category according to the results of the comparisons; calculating set-point values for the vehicle's control systems across the horizon according to rules pertaining to the categories in which segments within the horizon are placed; regulating the vehicle according to the set-point values. Also a module adapted to determining set-point values for a control system in the vehicle.

16 Claims, 4 Drawing Sheets

METHOD AND MODULE FOR DETERMINING OF REFERENCE VALUES FOR A VEHICLE CONTROL SYSTEM

CROSS-REFERENCE TO RELATED APPLICATIONS

The present application is a 35 U.S.C. §§371 national phase conversion of PCT/SE2010/050589, filed May 31, 2010, which claims priority of Swedish Application No. 0950434-1, filed Jun. 10, 2009, the contents of which are incorporated by reference herein. The PCT International Application was published in the English language.

FIELD OF THE INVENTION

The present invention relates to a method and a module for determining set-point values for a vehicle's control systems.

BACKGROUND TO THE INVENTION

Many vehicles today are equipped with a cruise control to make it easier for the driver to drive the vehicle. The desired speed can then be set by the driver, e.g. via a control device in the steering wheel console, and a cruise control system in the vehicle acts thereafter upon a control system so that it accelerates and brakes the vehicle in order to maintain a desired speed. If the vehicle is equipped with an automatic gear change system, the vehicle's gears are changed so that the vehicle can maintain the desired speed.

When a cruise control is used in hilly terrain, the cruise control system will try to maintain a set speed on upgrades. This results inter alia in the vehicle accelerating over the crest of a hill and possibly into a subsequent downgrade, making it necessary to brake to avoid exceeding the set speed, which is a fuel-expensive way of running the vehicle.

By varying the vehicle's speed in hilly terrain it is possible to save fuel as compared with a conventional cruise control. This may be done in various ways, e.g. by calculations of the vehicle's current state (as with Scania Ecocruise®). If an upgrade is calculated, the system then accelerates the vehicle uphill. Towards the end of the climb, the system is programmed to avoid acceleration until the gradient has levelled out at the top, provided that the vehicle's speed does not drop below a certain level. Lowering the speed at the end of an upgrade makes it possible to regain speed on a subsequent downgrade without using the engine to accelerate. When the vehicle approaches the bottom of a dip, the system endeavours to use kinetic energy to embark on the next upgrade at a higher speed than an ordinary cruise control. The system will easily provide acceleration at the end of the downgrade in order to maintain the vehicle's momentum. In undulating terrain, this means that the vehicle starts the next climb at a higher speed than normal. Avoiding unnecessary acceleration and using the vehicle's kinetic energy makes it possible to save fuel.

If the topology ahead is made known by the vehicle having map data and GPS, such a system can be made more robust and can also change the vehicle's speed in anticipation.

There are existing systems which incorporate the topology ahead in the calculations for the vehicle's speed by doing real-time optimisations of the vehicle's speed across an itinerary. This may result in a very heavy computation load on the hardware in a real-time system in a vehicle, since such systems often have limited resources in terms of memory and processor power. Even doing ordinary calculations and simulations on line across the known route profile may represent a heavy computation load. If for example the precision or resolution of the horizon vectors for calculating road gradients is too great, unnecessary computation power is also involved.

A way of sparing the vehicle's computation power is referred to in published patent application US 2008/0188996 which refers to a driver assistance system in which a number of sensors supply attendant traffic factors and create hypotheses which are logically related to one another. However, that system is not related to cruise control of vehicles.

Published patent application US 2003/0163226 refers to a system for dynamic estimation of a vehicle's speed. Computation power can be saved by using an observer (LVP, linear parameter varying).

The object of the present invention is to propose an improved system for determining set-point values for a control system in a vehicle which in particular reduces the amount of computation power needed when set-point values for the vehicle's control systems have to be regulated.

SUMMARY OF THE INVENTION

The object described above is achieved by a method for determining set-point values for a vehicle's control systems according to the invention, which comprises the steps of:
A) determining a horizon by means of position data and map data of an itinerary made up of route segments with at least one characteristic for each segment;
B) calculating threshold values for said at least one characteristic of segments according to one or more vehicle-specific values, which threshold values serve as boundaries for assigning segments to various categories;
C) comparing said at least one characteristic of each segment with the calculated threshold values and placing each segment in a category according to the results of the comparisons;
D) calculating set-point values for the vehicle's control systems across the horizon according to rules pertaining to the categories in which segments within the horizon are placed;
E) regulating the vehicle according to the speed set-point values.

The invention comprises also a module for determining set-point values for a vehicle's control systems, which module comprises:
a horizon unit adapted to determining a horizon by means of received position data and map data of an itinerary made up of route segments with at least one characteristic for each segment;
a processor unit adapted to calculating threshold values for said at least one characteristic of segments according to one or more vehicle-specific values, which threshold values serve as boundaries for assigning segments to various categories; comparing at least one characteristic of each segment with the calculated threshold values and placing each segment in a category according to the results of the comparisons; which processor unit is further adapted to calculating set-point values for the vehicle's control systems across the horizon according to rules pertaining to the categories in which segments within the horizon are placed; which control system regulates the vehicle according to these set-point values.

The regulating method according to the invention makes it possible to minimise the amount of fuel needed during the vehicle's journey by taking information about the itinerary into account. Map data, e.g. in the form of a database on board the vehicle with altitude information, and a positioning system, e.g. GPS, provide information about road topography along the itinerary. The control system is thereafter supplied with set-point values and regulates the vehicle according to them.

Using a rule-based cruise control method instead of, for example, an optimising motion involves far less computation power of the processor unit which performs the calculations in the vehicle. Moreover, data describing the horizon ahead can be reduced by taking into account various physical threshold values. A reduced horizon means less demand for memory use and quick calculations, making it possible to reduce the amount of computing power needed.

Using a rule-based method results in a predictable robust method which can quickly calculate set-point values for the control system or control systems in the vehicle.

Preferred embodiments are described in the dependent claims and in the detailed description.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Information about a vehicle's itinerary can be used to determine its set-point speed $v_{ref}$ for the engine control system in the vehicle in anticipation in order to save fuel, increase safety and enhance comfort. Other set-point values for other control systems may also be regulated. Topography greatly affects the control of, in particular, the driveline of heavy vehicles, since much more torque is required uphill than downhill and to make it possible to climb some hills without changing gear.

The vehicle is provided with a positioning system and map information, and position data from the positioning system and topology data from the map information are used to construct a horizon which illustrates the nature of the itinerary. In the description of the present invention, GPS (Global Positioning System) is indicated for determining position data for the vehicle, but it should be appreciated that other kinds of global or regional positioning systems are also conceivable to provide the vehicle with position data, e.g. systems which use a radio receiver to determine the vehicle's position. The vehicle may also use sensors to scan the surroundings and thereby determine its position.

Figure 1:
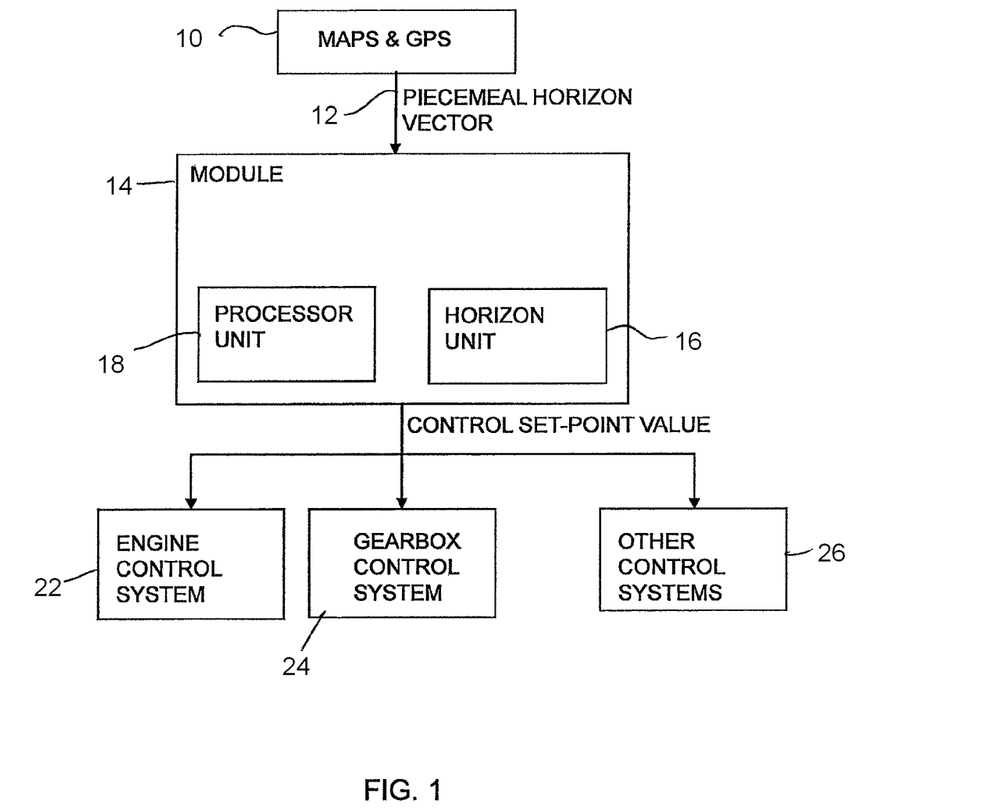
FIG. 1 depicts the functional context of the regulating module in the vehicle according to an embodiment of the invention.

FIG. 1 illustrates how a unit 10 incorporates map and GPS information about the itinerary. The itinerary is exemplified below as a single route for the vehicle but it should be appreciated that various conceivable itineraries are incorporated as information via maps and GPS or other positioning systems. The driver may also register the starting point and destination point of the intended journey, in which case the unit uses map data etc. to calculate a suitable route. The itinerary or, if there are two or more possible alternatives, the itineraries are sent 12 bit by bit via CAN to a module 14 for regulation of set-point values, which module may be separate from or form part of the systems which are to use the set-point values for regulating. Alternatively, the unit with maps and a positioning system may also be part of a system which uses the set-point values for regulating. In the regulating module 14, the bits are put together in a horizon unit 16 to form a horizon and are processed by the processor unit 18 to create an internal horizon by which the control system can regulate. If there are two or more alternative itineraries, a number of internal horizons are created for the various alternatives. The control system may be any of the various control systems in the vehicle, e.g. engine control system 22, gearbox control system 24 or some other control system 26. A horizon is usually put together for each control system, since the control systems regulate by different parameters. The horizon is then continually supplemented by new bits from the unit with GPS and map data to maintain a desired length of horizon. The horizon is thus updated continuously when the vehicle is in motion.

CAN (controller area network) is a serial bus system specially developed for use in vehicles. The CAN data bus makes digital data exchange possible between sensors, regulating components, actuators, control devices, etc. and ensures that two or more control devices can have access to the signals from a given sensor in order to use them to control components connected to them.

Figure 2:
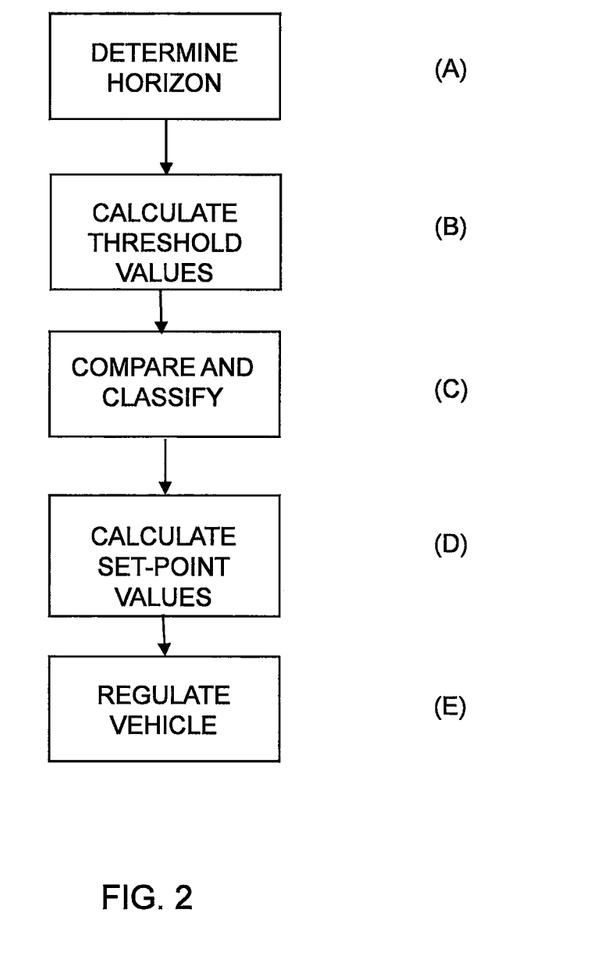
FIG. 2 depicts a flowchart for the method according to an embodiment of the invention.

FIG. 2 is a flowchart illustrating the steps which the method according to an embodiment of the invention comprises. The example described below refers to only one horizon but it should be appreciated that two or more horizons for various alternative itineraries may be constructed in parallel. A first step A) determines a horizon based on position data and map data of an itinerary made up of route segments with at least one characteristic for each segment. When the vehicle is on the move, the horizon module puts the bits together to form a horizon of the itinerary, the length of the horizon being typically of the order of 1 to 2 km. The horizon unit keeps track of where the vehicle is and continually adds to the horizon so that the length of the horizon is kept constant. According to an embodiment, when the destination point of the journey is within the length of the horizon, the horizon is no longer added to, since travelling beyond the destination point is not relevant.

The horizon is made up of route segments which have one or more inter-related characteristics. The horizon is here exemplified in matrix form in which each column contains a characteristic for a segment. A matrix covering 80 m forwards of an itinerary may take the following form:

$$\begin{bmatrix} dx, & \% \\ 20, & 0.2 \\ 20, & 0.1 \\ 20, & -0.1 \\ 20, & -0.3 \end{bmatrix},$$

where the first column is the length of each segment in meters (dx) and the second column the gradient in % of each segment. The matrix is to be taken to mean that for 20 meters forwards from the vehicle's current position the gradient is 0.2%, followed by 20 meters with a gradient of 0.1%, and so on. The values for segments and gradients need not be expressed in relative values but may instead be expressed in absolute values. The matrix is with advantage vector-formed but may instead be of pointer structure, in the form of data packages or the like. There are various other conceivable characteristics, e.g. radius of curvature, traffic signs, various hindrances etc.

According to an embodiment of the invention depicted as step $A_1$) in the flowchart in FIG. 3, the horizon constructed may thereafter be simplified by comparing the characteristics of adjacent segments and combining said adjacent segments in cases where the difference between their characteristics is below a certain value. The value is preferably set so that the difference becomes small enough not to affect the regulating performance of the method. If for example the difference of 0.1% in gradient is deemed small enough in the above example where length and gradient are the segment characteristics, segments one and two in the vector might be combined and their average gradient be used instead. The simplified horizon, here in the form of a simplified matrix, then becomes:

$$\begin{bmatrix} dx, & \% \\ 40, & 0.15 \\ 20, & -0.1 \\ 20, & -0.3 \end{bmatrix}$$

Figure 3:
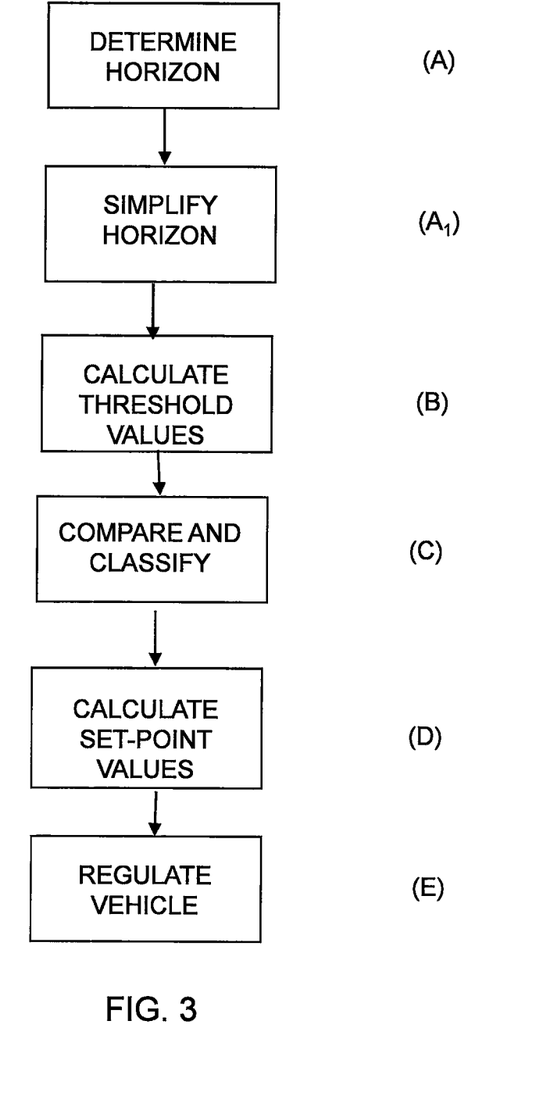
FIG. 3 depicts a flowchart for the method according to another embodiment of the invention.

After this simplification, or directly after step A, i.e. in the event of not opting for the simplification according to step $A_1$) in FIG. 3, segments within the horizon are placed in various categories in a step B) in which threshold values are calculated for said at least one characteristic of segments according to one or more vehicle-specific values, which threshold values serve as boundaries for assigning segments to various categories. In the example where the characteristics of segments are gradients, threshold values are calculated for their gradients. The threshold values for the characteristic concerned are calculated, according to an embodiment of the invention, by one or more vehicle-specific values, e.g. current transmission ratio, current vehicle weight, the engine's maximum torque curve, mechanical friction and/or the vehicle's running resistance at current speed. A vehicle model internal to the control system is used to estimate running resistance at current speed. Transmission ratio and maximum torque are known magnitudes in the vehicle's control system, and vehicle weight is estimated on-line.

The following are examples of five different categories in which segments may be placed when the gradient of segments is used for taking decisions about the control of the vehicle:

Level road: Segment with gradient 0±a tolerance.
Steep upgrade: Segment with too steep a gradient for the vehicle to maintain speed in current gear.
Gentle upgrade: Segment with gradient between tolerance and threshold value for sharp upgrade.
Steep downgrade: Segment with such a steep downhill gradient that the vehicle is accelerated by the gradient.
Gentle downgrade: Segment with a downward gradient between the negative tolerance and the threshold value for sharp downgrade.

According to an embodiment of the invention, the characteristics of segments are their length and gradient, and placing segments in the categories described above involves calculating threshold values in the form of two gradient threshold values $l_{min}$ and $l_{max}$, where $l_{min}$ is the minimum gradient for the vehicle to be accelerated by the gradient downhill, and $l_{max}$ is the maximum gradient at which the vehicle can maintain speed without changing gear uphill. Thus the vehicle can be regulated according to the gradient and length of the road ahead so that it can be driven in a fuel economising way by means of cruise control in undulating terrain. In another embodiment, the characteristics of the segments are their length and lateral acceleration, and threshold values are calculated in the form of lateral acceleration threshold values which classify segments by how much lateral acceleration they cause. The vehicle's speed can thereafter be regulated so that it can be driven in a way suited to fuel economy and traffic safety with regard to road curvature, i.e. any speed reduction before a bend is as far as possible effected without use of service brakes. For example, the tolerance for the "level road" category is preferably between 0.05% and −0.05% when the vehicle travels at 80 km/h. On the basis of the same speed (80 km/h), $l_{min}$ is usually calculated to be of the order of −2 to −7%, and $l_{max}$ usually 1 to 6%. However, these values depend greatly on current transmission ratio (gear+fixed rear axle ratio), engine performance and total weight.

In a next step C) of the method, the characteristics, in this case the gradient, of each segment are compared with the calculated threshold values, and each segment is placed in a category by the results of the comparisons.

There might instead or in addition be for example similar classification by radius of curvature of the road, whereby bends might be classified by how much lateral acceleration they cause.

After each segment within the horizon has been placed in a category, an internal horizon for the control system can be constructed on the basis of the classification of segments and the horizon, comprising for each segment entry speeds $v_i$ which the control system has to abide by. According to an embodiment, a speed change requested between two entry speeds $v_i$ is ramped in order to provide set-point values $v_{ref}$ for the control system which effect a gradual increase or decrease of the vehicle's speed. Ramping a speed change results in calculation of gradual speed changes which need to be made in order to achieve the speed change. In other words, ramping results in a linear speed increase. The entry speeds $v_i$, i.e. set-point values for the vehicle's control systems, are calculated in a step D) according to the method according to the invention across the horizon according to rules pertaining to the categories in which segments within the horizon are placed. All the segments within the horizon are stepped through continuously, and as new segments are added to the horizon the entry speeds $v_i$ are adjusted in them as necessary within the range of the vehicle's reference speed $v_{set}$. $v_{set}$ is the reference speed set by the driver and desired to be kept by the vehicle's control systems when travelling within a range. The range is bounded by two speeds $v_{min}$ and $v_{max}$ which may be set manually by the driver or be set automatically by calculations of suitable ranges preferably calculated in the regulating module. The vehicle is thereafter regulated in a step E) according to the set-point values, which in the example described means that the cruise control in the vehicle regulates the vehicle's speed according to the set-point values.

Set-point values $v_{ref}$ for the control system in the vehicle may be allowed to vary between the two abovementioned speeds $v_{min}$ and $v_{max}$. When the regulating module predicts an internal horizon for the vehicle's speed, the vehicle's speed may then vary within this range.

The various rules for the segment categories therefore regulate how the entry speed $v_i$ for each segment is to be adjusted. If a segment is placed in the "level road" category, no change will take place in the entry speed $v_i$ to the segment.

Driving the vehicle such that comfort requirements are met involves using Torricelli's equation as below to calculate the constant acceleration or retardation which needs to be applied to the vehicle:

$$v_{slut}^2 = v_i^2 + 2 \cdot a \cdot s \quad (1)$$

where $v_i$ is the entry speed to the segment, $v_{slut}$ the vehicle's speed at the end of the segment, a the constant acceleration/retardation and s the length of the segment.

If a segment is in the "steep upgrade" or "steep downgrade" category, the final speed $v_{slut}$ for the segment is predicted by solving equation (2) below:

$$v_{slut}^2 = (a \cdot v_i^2 + b) \cdot (e^{(2 \cdot a \cdot s/M)} - b) 5/a \quad (2)$$

where $$a = -C_d \cdot \rho \cdot A/2 \quad (3)$$

$$b = F_{track} - F_{roll} - F_\alpha \quad (4)$$

$$F_{track} = (T_{eng} \cdot i_{final} \cdot i_{gear} \cdot \mu_{gear})/r_{wheel} \quad (5)$$

$$F_{roll} = \text{flatCorr} \cdot M \cdot g/1000 \cdot (C_{rrisoF} + C_b \cdot (v_i - v_{iso}) + C_{aF} \cdot (v_i^2 - v_{iso}^2)) \quad (6)$$

$$F_\alpha = M \cdot g \cdot \sin(\arctan(\alpha)) \quad (7)$$

$$\text{flatCorr} = 1/\sqrt{(1 + r_{wheel}/2.70)} \quad (8)$$

where $C_d$ is the air resistance coefficient, $\rho$ the density of the air, A the largest cross-sectional area of the vehicle, $F_{track}$ the force acting from the engine torque in the vehicle's direction of movement, $F_{roll}$ the force from the rolling resistance acting upon the wheels, $F_\alpha$ the force acting upon the vehicle because of the gradient $\alpha$ of the segment, $T_{eng}$ the engine torque, $i_{final}$ the vehicle's final gear, $i_{gear}$ the current transmission ratio in the gearbox, $\mu_{gear}$ the efficiency of the gear system, $r_{wheel}$ the vehicle's wheel radius, M the vehicle's weight, $C_{aF}$ and $C_b$ speed-dependent coefficients related to the rolling resistance of the wheels, $C_{rrisoF}$ a constant term related to the rolling resistance of the wheels and $V_{iso}$ an ISO speed, e.g. 80 km/h.

On segments in the "steep upgrade" category, the final speed $v_{slut}$ is thereafter compared with $v_{min}$, and if $v_{slut} < v_{min}$, then $v_i$ has to be increased so that $$v_i = \min(v_{max}, v_i + (v_{min} - v_{slut})) \quad (9)$$

otherwise no change in $v_i$ takes place, since $v_{slut}$ meets the requirement of being within the range for the reference speed.

On segments in the "steep downgrade" category, the final speed $v_{slut}$ is compared with $v_{max}$, and if $v_{slut} > v_{max}$, then $v_i$ has to be decreased so that $$v_i = \max(v_{min}, v_i - (v_{slut} - v_{max})) \quad (10)$$

otherwise no change in $v_i$ takes place, since $v_{slut}$ meets the requirement of being within the range for the reference speed.

Torricelli's equation (1) is here again used to calculate whether it is possible to achieve $v_{slut}$ with the entry speed $v_i$ with comfort requirement, i.e. with predetermined maximum constant acceleration/retardation. If this is not possible because of the length of the segment, $v_i$ is increased or decreased so that the comfort requirement, i.e. not too much acceleration/retardation, can be maintained.

On segments in the "gentle upgrade" category, the set-point value $v_{ref}$ is allowed to vary between $v_{min}$ and $v_{set}$ when a new segment is incorporated, i.e. $v_{min} \leq v_{ref} \leq v_{set}$. If $v_{ref} \geq v_{min}$, no acceleration of the vehicle is effected. If however $v_{ref} < v_{min}$, then $v_{ref}$ is applied to $v_{min}$ during the segment, or if $v_{ref} > v_{set}$, then $v_{ref}$ is ramped towards $v_{set}$ by means of equation (1). On segments in the "gentle downgrade" category, $v_{ref}$ is allowed to vary between $v_{set}$ and $v_{max}$ when a new segment is incorporated, i.e. $v_{set} \leq v_{ref} \leq v_{max}$, and if $v_{ref} \leq v_{max}$ no retardation of the vehicle is effected. If however $v_{ref} > v_{max}$, then $v_{ref}$ is applied to $v_{max}$ during the segment, or if $v_{ref} < v_{set}$, then $v_{ref}$ is ramped towards $v_{set}$ by means of equation (1). The five segment categories above may be simplified to three by deleting "gentle upgrade" and "gentle downgrade". The "level road" category will then cover a larger range bounded by the calculated threshold values $l_{min}$ and $l_{max}$, so the gradient on the segment has to be smaller than $l_{min}$ if the gradient is negative or greater than $l_{max}$ if the gradient is positive.

When a segment which comes after a segment within the horizon which is in the "gentle upgrade" or "gentle downgrade" category causes a change in the entry speeds to segments in those categories, it may mean that entry speeds and hence the set-point speeds for the control system are corrected and become higher or lower than as indicated by the above rules for the "gentle upgrade or "gentle downgrade" categories. This therefore applies when the entry speeds to segments are corrected according to subsequent segments.

All speed changes requested are therefore ramped by means of Torricelli's equation (1) so that they take place with comfort requirement. Thus it is a general rule not to raise the set-point speed $v_{ref}$ on an upgrade, since any possible speed increase of $v_{ref}$ has to take place before the climb begins if the vehicle is to be driven in a cost-effective way. For the same reason, the set-point speed $v_{ref}$ should not be lowered on a downgrade, since any possible speed decrease of $v_{ref}$ has to take place before the downhill run.

By continuously stepping through all the segments within the horizon, it is possible to determine an internal horizon which provides predicted entry values $v_i$ for each segment. According to an embodiment, step A) is performed continuously so long as the horizon does not exceed a planned itinerary for the vehicle, and steps B) to E) are performed continuously for the whole length of the horizon. The horizon is updated preferably piecemeal, and has according to an embodiment not the same continuity in its updating as steps B) to E). The internal horizon is updated continually as new segments are added to the horizon, e.g. two to three times per second. Continuous stepping through segments within the horizon involves continuously calculating the entry values $v_i$ to each segment, and calculating an entry value $v_i$ may entail having to change entry values both forwards and backwards within the internal horizon. Where for example a predicted speed in a segment is outside a set range, it is desirable to correct the speed in preceding segments.

Figure 4:
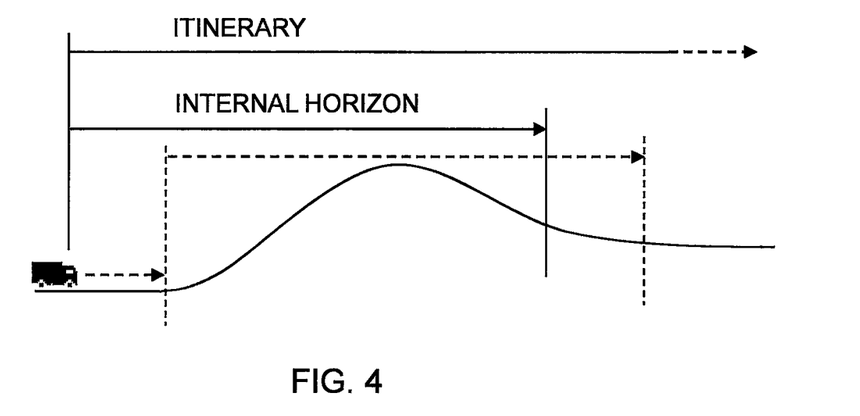
FIG. 4 illustrates the length of a control system's horizon in relation to the length of the itinerary for the vehicle.
Figure 5:
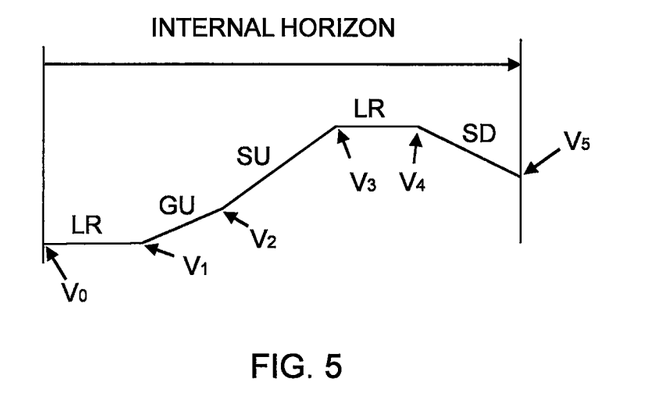
FIG. 5 illustrates the various speeds predicted and the categories of segments which are continuously updated as new segments are added to the horizon

FIG. 4 depicts the internal horizon relative to the itinerary. The internal horizon moves continually forwards as indicated by the broken inner horizon moved forward. FIG. 5 depicts an example of an internal horizon in which the various segments are placed in a category. In the diagram "LR" stands for "level road", "GU" for "gentle upgrade", "SU" for "steep upgrade" and "SD" for "steep downgrade". The speed is initially $v_0$, and if this is not $v_{set}$, the set-point values are ramped from $v_0$ to $v_{set}$ with comfort acceptance according to Torricelli's equation (1) because the category is "level road". The next segment is a "gentle upgrade" and no change in $v_{ref}$ takes place so long as $v_{min} \leq v_{ref} \leq v_{set}$, since no acceleration need be applied in this segment. The next segment is a "steep upgrade", so the final speed $v_3$ for it is predicted by means of formula (2), so $v_2$ has to be increased if $v_3 < v_{min}$ according to formula (9). The next segment is "level road", so $v_{ref}$ is changed towards $v_{set}$ with the limitation of the comfort requirement from Torricelli's equation (1). Thereafter comes a segment which is a "steep downgrade", so the final speed $v_5$ is predicted by means of formula (2) and $v_4$ has to be decreased if $v_5 > v_{max}$ according to formula (10). As soon as a speed backwards in the internal horizon is changed, the remaining speeds backwards in the internal horizon are adjusted to be able to fulfill the speed further forwards. At each speed change which has to be effected, the method according to the invention calculates by means of Torricelli's equation (1) whether it is possible to achieve the speed change with comfort requirement. If not, the entry speed to the segment is adjusted so that comfort requirement can be maintained.

The present invention relates also to a module for regulating a set-point value for vehicle's control systems, as depicted in FIG. 1. The module comprises a horizon unit adapted to determining a horizon by means of received position data and map data of an itinerary made up of route segments with at least one characteristic for each segment.

The module further comprises a processor unit adapted to performing method steps B) to D) as described above. The vehicle is thereafter regulated according to the set-point values in a step F). The result is a module which can be used in a vehicle to regulate set-point values in a computationally effective way, and the module may be part of a control system for which it is intended to regulate set-point values, or be a freestanding module separate from the control system.

The vehicle-specific values of current transmission ratio, current vehicle weight, the engine's maximum torque curve, mechanical friction and the vehicle's running resistance at current speed are preferably determined in the processor unit. The threshold values may therefore be determined on the basis of the vehicle's state at the time. Signals needed for determining these values may be taken from CAN or be detected by suitable sensors.

According to an embodiment, the characteristics of segments are their length and gradient and the processor unit is adapted to calculating the threshold values in the form of gradient threshold values $l_{min}$ and $l_{max}$. Thus the vehicle's speed can be regulated according to the undulation of the itinerary in order to travel in a fuel economising way.

According to another embodiment, the characteristics of segments are their length and lateral acceleration and the processor unit is adapted to calculating the threshold values in the form of lateral acceleration threshold values. This means that the vehicle's speed can be regulated according to the curvature of the road ahead, and the vehicle's speed can be pre-regulated so that unnecessary braking operations and speed increases are minimised in order to save fuel.

According to an embodiment, the processor unit in the module is adapted to simplifying the horizon according to method step $A_1$) described above. The resulting reduction in the amount of data makes it possible to reduce the demand for computation power.

The horizon unit is preferably adapted to determining the horizon continuously so long as the horizon does not exceed a planned itinerary for the vehicle, and the processor unit is adapted to continuously performing steps for calculating and updating the set-point values for the control system for the whole length of the internal horizon. In an embodiment, the horizon is thus constructed piecemeal progressively as the vehicle travels along the itinerary. The set-point values for the control system are calculated and updated continuously irrespective of whether new segments are added or not, since the set-point values to be calculated depend also on how the vehicle-specific values of the vehicle change along the itinerary.

The present invention comprises also a computer programme product comprising computer programme instructions for enabling a computer system in a vehicle to perform the steps according to the method when the computer programme instructions are run on said computer system. The computer programme instructions are preferably stored on a medium which is readable by a computer system, e.g. a CD ROM, USB memory, or they may be transmitted wirelessly or by line to the computer system.

The present invention is not limited to the embodiments described above. Various alternatives, modifications and equivalents may be used. The aforesaid embodiments therefore do not limit the scope of the invention which is defined by the attached claims.

The invention claimed is:

1. A method performed by a data processor for automatically determining set-point values for a vehicle's control system, the method comprising the steps of:
   A) determining a horizon by means of position data and map data of an itinerary including route segments with at least one characteristic for each segment;
   B) calculating threshold values for said at least one characteristic of each segment according to one or more vehicle-specific values;
   C) comparing said at least one characteristic of each segment with the calculated threshold values and assigning each segment within the horizon to a respective category of a plurality of categories according to the results of the comparisons, wherein the threshold values serve as boundaries for the assigning of the segments to the plurality of categories;
   D) calculating set-point values for the vehicle's control system across the horizon according to rules pertaining to the categories to which segments within the horizon are assigned;
   E) regulating the vehicle according to the set-point values.

2. A method according to claim 1, in which the vehicle-specific values are determined by current transmission ratio, current vehicle weight, a maximum torque curve of an engine of the vehicle, mechanical friction and/or the vehicle's running resistance at current speed.

3. A method according to claim 2, wherein the at least one characteristic of the segments includes a length and a gradient for each segment, and the threshold values are calculated in the form of gradient threshold values $l_{min}$ and $l_{max}$.

4. A method according to claim 3, wherein the at least one characteristic includes lateral acceleration, and the threshold values are calculated in the form of lateral acceleration threshold values.

5. A method according to claim 1, wherein the determining of the horizon is by using position data from GPS.

6. A method according to claim 1, further comprising, after the determining of the horizon and before the calculating of the threshold values, simplifying the horizon by comparing the characteristics of adjacent segments, and combining the adjacent segments when a difference between their characteristics is below a set value.

7. A method according to claim 1, further comprising: performing step A) continuously so long as the horizon does not exceed a planned itinerary for the vehicle, and performing steps B) to E) continuously for all segments within the horizon.

8. A module for determining set-point values for a vehicle's control system, which module comprises:
   a horizon unit configured and operable to determine a horizon by means of received position data and map data of an itinerary for the vehicle, the itinerary comprising route segments with at least one characteristic for each segment;
   a processor unit incorporating a data processor, the processor unit configured and operable:

to calculate threshold values for the at least one characteristic of each segment according to one or more vehicle-specific values;

to compare the at least one characteristic of each segment with the calculated threshold values and to assign each segment to a respective category according to the results of the comparisons, wherein the threshold values serves as boundaries for the assigning of the segments to the categories;

to calculate set-point values for the vehicle's control systems across the horizon according to rules pertaining to the categories to which the segments within the horizon are assigned, wherein the control system regulates the vehicle according to the set-point values.

9. A module according to claim 8, wherein the vehicle-specific values are determined based on a current transmission ratio, a current vehicle weight, a maximum torque curve of an engine of the vehicle, mechanical friction and/or a running resistance at current speed of the vehicle.

10. A module according to claim 9, wherein the at least one characteristic of each segment includes a segment length and a segment gradient, and the processor unit is configured and operable to calculate the threshold values in the form of gradient threshold values $l_{min}$ and $l_{max}$.

11. A module according to claim 9, wherein the at least one characteristic of each segment includes lateral acceleration, and the processor unit is configured and operable to calculate the threshold values in the form of lateral acceleration threshold values.

12. A module according to claim 8, further comprising a GPS configured and operable to determine position data for the determining of the horizon.

13. A module according to claim 8, wherein the processor unit is configured and operable to simplify the horizon by comparing the characteristics of adjacent segments and combining the adjacent segments when a difference between their characteristics of the adjacent segments is below a set value.

14. A module according to claim 8, wherein the horizon unit is configured and operable to determine the horizon continuously so long as the horizon does not exceed a planned itinerary for the vehicle, and the processor unit is configured and operable to continuously perform steps to calculate and update the set-point values for the control system for all segments within the horizon.

15. A non-transitory computer-readable medium incorporating computer program instructions for enabling a computer system in a vehicle to:

A) determine a horizon by means of position data and map data of an itinerary including route segments with at least one characteristic for each segment;

B) calculate threshold values for said at least one characteristic of each segment according to one or more vehicle-specific values;

C) compare said at least one characteristic of each segment with the calculated threshold values and assigning each segment within the horizon to a respective category of a plurality of categories according to the results of the comparisons, wherein the threshold values serve as boundaries for the assigning of the segments to the plurality of categories;

D) calculate set-point values for the vehicle's control system across the horizon according to rules pertaining to the categories to which segments within the horizon are assigned;

E) regulate the vehicle according to the set-point values, when the computer program instructions are run on the computer system.

16. A non-transitory computer-readable medium according to claim 15, wherein the computer-readable medium is stored on-board the vehicle in the computer system.

\* \* \* \* \*